US012485795B2

(12) United States Patent
Klein et al.

(10) Patent No.: US 12,485,795 B2
(45) Date of Patent: Dec. 2, 2025

(54) REINFORCEMENT LEARNING FOR CONTINUED LEARNING OF OPTIMAL BATTERY CHARGING

(71) Applicant: Robert Bosch GmbH, Stuttgart (DE)

(72) Inventors: Reinhardt Klein, Mountain View, CA (US); Nikhil Ravi, Redwood City, CA (US); Christoph Kroener, Freiberg am Neckar (DE); Jared Evans, Sunnyvale, CA (US)

(73) Assignee: Robert Bosch GmbH (DE)

( * ) Notice: Subject to any disclaimer, the term of this patent is extended or adjusted under 35 U.S.C. 154(b) by 552 days.

(21) Appl. No.: 17/979,047

(22) Filed: Nov. 2, 2022

(65) Prior Publication Data

US 2024/0144078 A1    May 2, 2024

(51) Int. Cl.
  *B60L 58/16*  (2019.01)
  *B60L 53/62*  (2019.01)
  *G06N 20/00*  (2019.01)

(52) U.S. Cl.
  CPC .............. *B60L 58/16* (2019.02); *B60L 53/62* (2019.02); *G06N 20/00* (2019.01)

(58) Field of Classification Search
  CPC ....................................................... B60L 58/16
  USPC ....................................................... 320/109
  See application file for complete search history.

(56) References Cited

U.S. PATENT DOCUMENTS

| | | | |
|---|---|---|---|
| 11,803,750 B2 | 10/2023 | Lillicrap et al. | |
| 12,045,272 B2 | 7/2024 | Mahapatra et al. | |
| 2012/0105009 A1* | 5/2012 | Yao ..................... | G01R 31/389 320/157 |
| 2014/0253039 A1* | 9/2014 | Barsukov .......... | H02J 7/007184 320/112 |

(Continued)

FOREIGN PATENT DOCUMENTS

CN    115015786 A    9/2022

OTHER PUBLICATIONS

Nicolas Heess et al., "Memory-based control with recurrent neural networks." arXiv:1512.04455v1 [cs.LG] Dec. 14, 2015, 11 Pages.

(Continued)

*Primary Examiner* — Jerry D Robbins
(74) *Attorney, Agent, or Firm* — Dickinson Wright PLLC

(57) ABSTRACT

Methods and systems of optimizing battery charging are disclosed. Battery state sensors are used to determine anode overpotential of a battery multiple times during multiple charge cycles. In a first phase, a reinforcement learning model (e.g., actor-critic model) is trained with rewards given throughout each charge cycle of the battery to optimize training. The reinforcement learning model can determine state-of-health characteristics of the battery over the charge cycles, and in a second phase, the reinforcement learning model is augmented accordingly. During this augmentation, the reinforcement learning model is trained with rewards given on a charge cycle-by-cycle basis, wherein rewards are given after looking at the charging optimization after the conclusion of each charge cycle. Commands are given to (Continued)

charge an on-field battery based on the augmented reinforcement learning model, associated state-of-health characteristics of the on-field battery are determined, and the reinforcement learning model is further augmented accordingly.

20 Claims, 8 Drawing Sheets

(56) References Cited

U.S. PATENT DOCUMENTS

| | | | |
|---|---|---|---|
| 2019/0229378 A1* | 7/2019 | Zhang | H01M 10/486 |
| 2019/0236455 A1 | 8/2019 | Taylor et al. | |
| 2020/0086483 A1 | 3/2020 | Li et al. | |
| 2020/0410351 A1 | 12/2020 | Lillicrap et al. | |
| 2021/0009226 A1 | 1/2021 | Yamamoto et al. | |
| 2021/0326595 A1 | 10/2021 | Goldberg et al. | |
| 2022/0147897 A1 | 5/2022 | Liebman et al. | |
| 2022/0209562 A1* | 6/2022 | Kessner | H02M 3/157 |
| 2022/0406046 A1 | 12/2022 | Mummadi et al. | |
| 2023/0130896 A1* | 4/2023 | Lee | H01M 10/486 320/152 |
| 2023/0196382 A1 | 6/2023 | Dev et al. | |
| 2023/0206111 A1 | 6/2023 | Alam et al. | |
| 2023/0229957 A1 | 7/2023 | Li et al. | |
| 2023/0268770 A1* | 8/2023 | Howlett, III | H02J 50/10 320/108 |
| 2024/0053403 A1* | 2/2024 | Wang | G01R 31/367 |
| 2024/0059170 A1 | 2/2024 | Khamis et al. | |
| 2024/0079900 A1* | 3/2024 | Kessner | H02M 3/33507 |
| 2024/0127788 A1 | 4/2024 | Hsieh et al. | |
| 2024/0303973 A1 | 9/2024 | Ramos Dos Santos et al. | |
| 2024/0429730 A1 | 12/2024 | Abbott et al. | |

OTHER PUBLICATIONS

Peter M. Attia et al. "Closed-loop optimization of fast-charging protocols for batteries with machine learning." Nature Feb. 20, 2020, vol. 578, pp. 397-418.

Saehong Park et al., "Reinforcement Learning-based Fast Charging Control Strategy for Li-ion Batteries." arXiv:2002.02060v2 [eess.SY] Jun. 25, 2020, 8 Pages.

Yu Sui et al., "A Multi-Agent Reinforcement Learning Framework for Lithium-ion Battery Scheduling Problems." Energies 2020, 13(8), 1982; https://doi.org/10.3390/en13081982, 13 Pages.

* cited by examiner

REINFORCEMENT LEARNING FOR CONTINUED LEARNING OF OPTIMAL BATTERY CHARGING

CROSS-REFERENCE TO RELATED APPLICATIONS

The present disclosure is related to the following applications which are filed on the same day as this application, and which are incorporated by reference herein in their entirety:

U.S. patent application Ser. No. 17/979,052, titled SMOOTHED REWARD SYSTEM TRANSFER FOR ACTOR-CRITIC REINFORCEMENT LEARNING MODELS U.S. patent application Ser. No. 17/979,054, titled NEURAL NETWORK FEATURE EXTRACTOR FOR ACTOR-CRITIC REINFORCEMENT LEARNING MODELS

TECHNICAL FIELD

The present disclosure relates to reinforcement learning for continued learning of optimal battery charging.

BACKGROUND

Rechargeable batteries are used in a plethora of environments, including hybrid or electric vehicles, portable consumer devices (e.g., mobile phones and similar electronic devices), power tools, appliances, and so on. Such batteries can have a charge capacity and lifespan that varies. While it is understood that the charging of a battery can impact the ultimate battery life, all of the factors that influence battery life (including the charging profile itself) are complex and difficult to measure directly. A leading approach to battery charging uses electro-chemical models to optimize charge curves (current vs. time while charging). Electro-chemical models use systems of partial differential equations to model known physical processes taking place inside the battery. Smart charging algorithms estimate the state of battery degradation dynamically via an electro-chemical model and adjust charging to minimize the predicted impact using standard optimization methods. Crucially, this approach relies heavily on having an accurate battery model. Laboratory observations have shown that there can be substantial differences between the electro-chemical model and real batteries. These differences are difficult to correct, and may result in more rapid aging than was predicted in simulation.

Reinforcement learning is an area of machine learning concerned with how intelligent agents ought to take actions in an environment in order to maximize the notion of cumulative reward. Reinforcement learning is a candidate to optimize battery charging, but the current studies are limited in scope, restricted to specific temperatures, tied to laboratory data, and process somewhat inconsistent or rather bizarre results.

SUMMARY

According to an embodiment, a method of optimizing a charging of a vehicle battery based on both simulation data and field data includes: receiving, at a simulator, simulation battery charge data associated with charging of a simulation vehicle battery; determining, at the simulator, an anode overpotential of the simulation vehicle battery during each charge cycle of the simulation vehicle battery; training an actor-critic model based on the anode overpotential, wherein the actor-critic model is trained with rewards given throughout each charge cycle of the simulation vehicle battery; determining, via the actor-critic model, state-of-health characteristics of the simulation vehicle battery over multiple charge cycles; augmenting the actor-critic model based on the state-of-health characteristics of the simulation vehicle battery over multiple charge cycles, wherein the actor-critic model is trained with rewards given on a charge cycle-by-cycle basis; commanding a charging of an on-field vehicle battery based on an output of the augmented actor-critic model; based on the charging of the on-field vehicle battery, determining state-of-health characteristics of the on-field vehicle battery; further augmenting the augmented actor-critic model based on the state-of-health characteristics of the on-field vehicle battery, wherein the actor-critic model is further trained with rewards given based on multiple charge cycles; and based on the further augmenting, outputting a trained actor-critic model configured to optimize charging of on-field vehicle batteries.

According to an embodiment, a system of optimizing a charging of a battery based on both simulation data and field data comprises one or more processors, and memory storing instructions that, when executed by the one or more processors, cause the one or more processors to: receive, at a simulator, simulation battery charge data associated with charging of a simulation battery; determine, at the simulator, an anode overpotential of the simulation battery during each charge cycle of the simulation battery; train an actor-critic model based on the anode overpotential, wherein the actor-critic model is trained with rewards given throughout each charge cycle of the simulation battery; determine, via the actor-critic model, state-of-health characteristics of the simulation battery over multiple charge cycles; augment the actor-critic model based on the state-of-health characteristics of the simulation battery over multiple charge cycles, wherein the actor-critic model is trained with rewards given on a charge cycle-by-cycle basis; command a charging of an on-field battery based on an output of the augmented actor-critic model; based on the charging of the on-field battery, determine state-of-health characteristics of the on-field battery; further augment the augmented actor-critic model based on the state-of-health characteristics of the on-field battery, wherein the actor-critic model is further trained with rewards given based on multiple charge cycles; and based on the further augmenting, output a trained actor-critic model configured to optimize charging of on-field batteries.

According to an embodiment, a non-transitory computer readable storage medium contains a plurality of program instructions, which when executed by a processor, cause the processor to perform the steps of: receiving, at a simulator, simulation battery charge data associated with charging of a simulation vehicle battery; determining, at the simulator, an anode overpotential of the simulation vehicle battery during each charge cycle of the simulation vehicle battery; training an actor-critic model based on the anode overpotential, wherein the actor-critic model is trained with rewards given throughout each charge cycle of the simulation vehicle battery; determining, via the actor-critic model, state-of-health characteristics of the simulation vehicle battery over multiple charge cycles; augmenting the actor-critic model based on the state-of-health characteristics of the simulation vehicle battery over multiple charge cycles, wherein the actor-critic model is trained with rewards given on a charge cycle-by-cycle basis; commanding a charging of an on-field vehicle battery based on an output of the augmented actor-critic model; based on the charging of the on-field vehicle battery, determining state-of-health characteristics of the on-field vehicle battery; further augmenting the augmented actor-critic model based on the state-of-health characteristics of the on-field vehicle battery, wherein the actor-critic model is further trained with rewards given based on multiple charge cycles; and based on the further augmenting, outputting a trained actor-critic model configured to optimize charging of on-field vehicle batteries.

DETAILED DESCRIPTION

Figure 1:
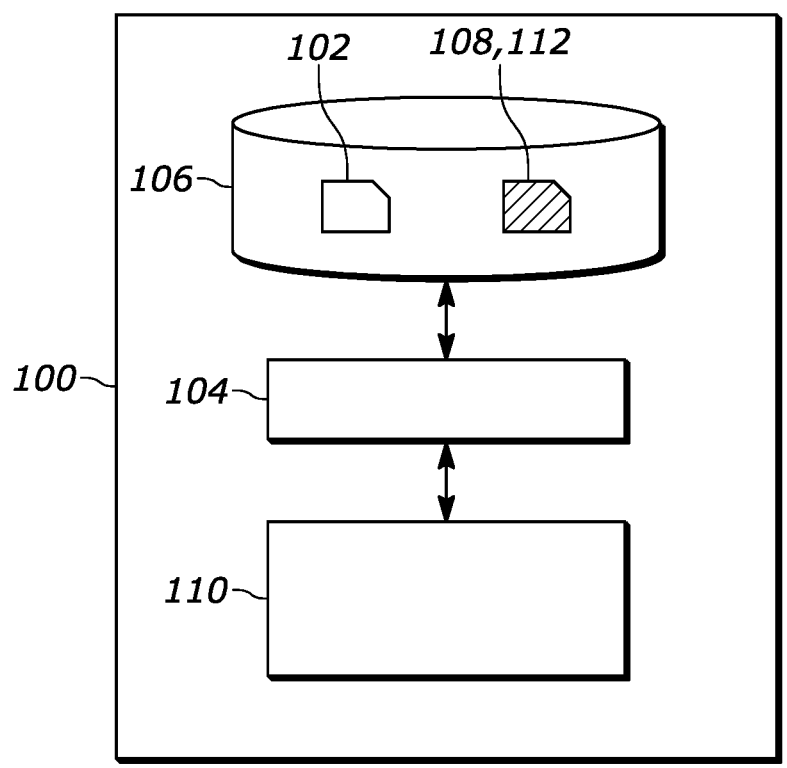
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Rechargeable batteries are used in a plethora of environments, including hybrid or electric vehicles, portable consumer devices (e.g., mobile phones and similar electronic devices), power tools, appliances, and so on. The factors that influence battery life are complex and difficult to measure directly. Using electro-chemical models to optimize charge curves (current vs. time while charging) rely on systems of partial differential equations to model known physical processes taking place inside the battery. Smart charging algorithms estimate the state of battery degradation dynamically via an electro-chemical model and adjust charging to minimize the predicted impact using standard optimization methods. However, this approach relies heavily on having an accurate battery model. Moreover, laboratory observations have shown that there can be substantial differences between the electro-chemical model and real batteries. These differences are difficult to correct, and may result in more rapid aging than was predicted in simulation.

Reinforcement learning is an area of machine learning concerned with how intelligent agents ought to take actions in an environment in order to maximize the notion of cumulative reward. Reinforcement learning is a candidate to optimize battery charging, but the current studies are limited in scope, restricted to specific temperatures, tied to laboratory data, and process somewhat inconsistent or rather bizarre results.

According to embodiments of this disclosure, a hybrid model is disclosed that improves charging strategies by using available data to close the gap between the physical model and the real battery. In this context, a hybrid model includes an electro-chemical battery model working together with a set of neural networks that implement a reinforcement learning (RL) strategy. The neural networks take the state of the battery as input, and output a commanded charge current to charge the battery with. The model learns to maximize a reward function that accounts for both aging processes and charge time. The aging is measured in terms of state of health variable for capacity and resistance (SOHC and SOHR, respectively).

While the electro-chemical model contains many battery states, the models disclosed herein rely on observable or measured data as inputs to the neural networks. As the electro-chemical model is complicated, reinforcement learning can find a more optimal charging profile than obtainable through a direct heuristic-based model control. A benefit of this method comes from the algorithm's ability to adapt to real data. Real charging data can be processed through the electrochemical model to provide a model-informed estimation of the SOHC and SOHR changes. By then reweighting the assumed state-of-health changes by actual measured state-of-health changes, algorithm can be trained on these corrected values. The model can learn information pertaining to battery performance in the field, and not just from simulation and laboratory data.

The reinforcement learning methods disclosed herein have at least two significant advantages. First, the neural network can learn information about the complicated battery model to optimize over features with very complicated origins from the underlying states. Second, and more importantly, the models can utilize real data to adapt charging profiles to better account for real world conditions. While the model control method may outperform reinforcement learning in the laboratory, the ability to learn from and adapt to field behaviors allows for this model to thrive. Both of these advantages can in principle allow for a model to achieve better performance and extend the longevity of electric vehicle batteries.

Referring to the Figures, reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The backpropagation and/or forward propagation can continue until the models achieve a predetermined performance level (e.g., 100% agreement with the outcomes associated with the training data), or convergence. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The system 100 may further comprise an output interface for outputting a data representation 112 of the trained neural network, this data may also be referred to as trained model data or trained model parameters 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data parameters 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the models described herein. Additional structure for operating and training the machine-learning models is shown in FIG. 2.

Figure 2:
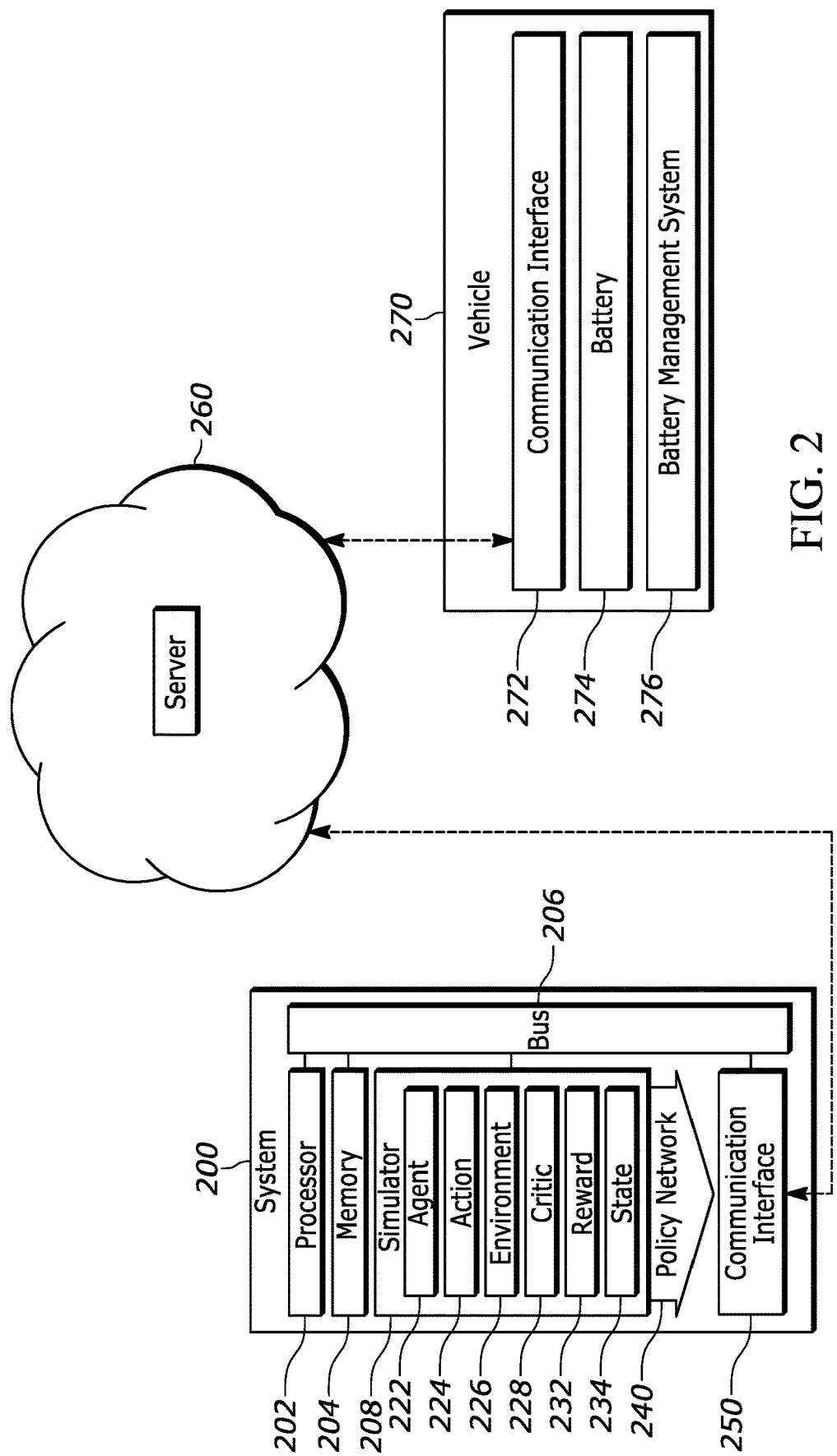
FIG. 2 illustrates an exemplary component diagram of a system for optimizing charging of a vehicle battery, according to an embodiment.
Figure 7:
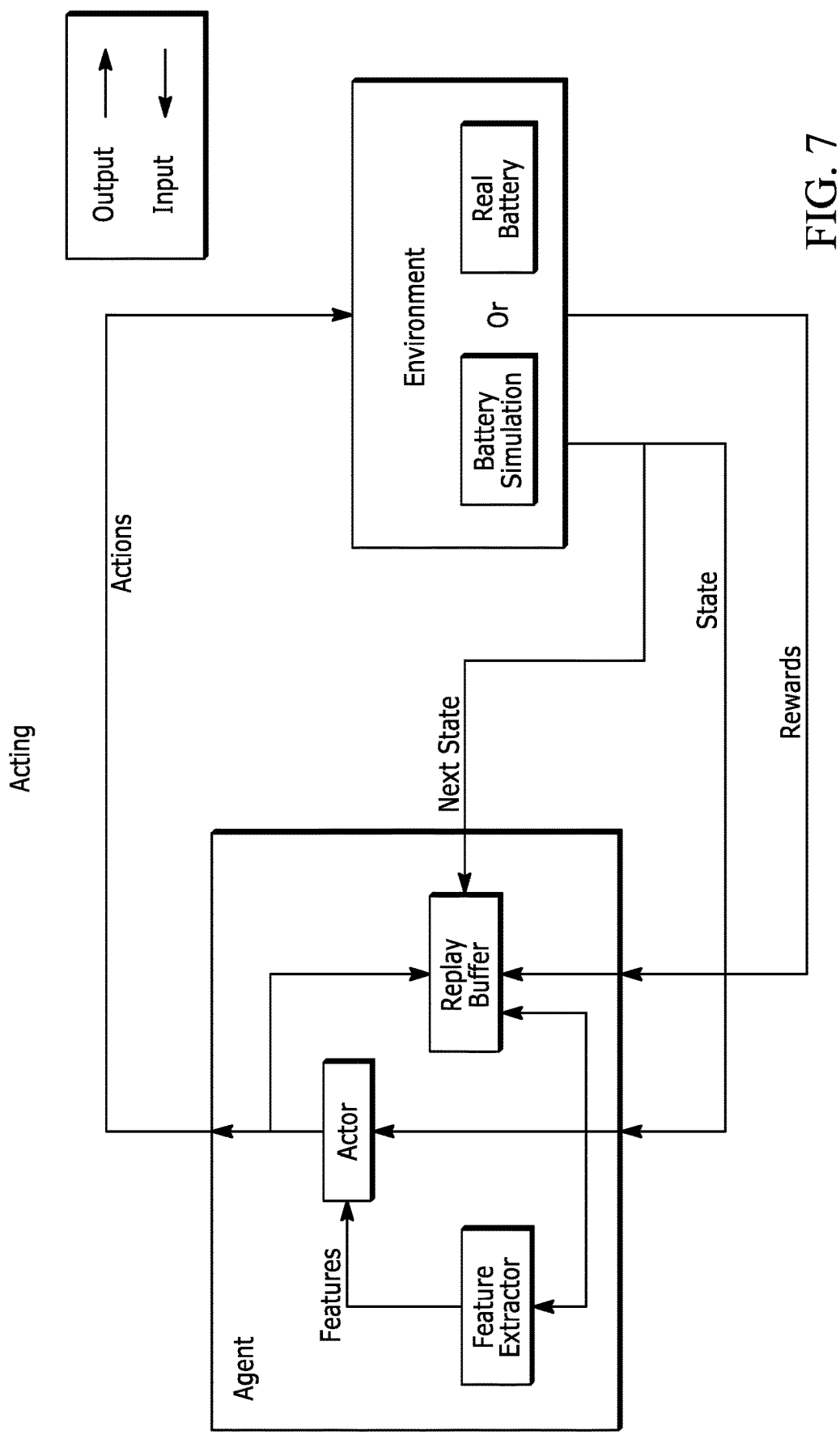
FIG. 7 illustrates the framework of an actor-critic model used during an acting phase, according to an embodiment.
Figure 8:
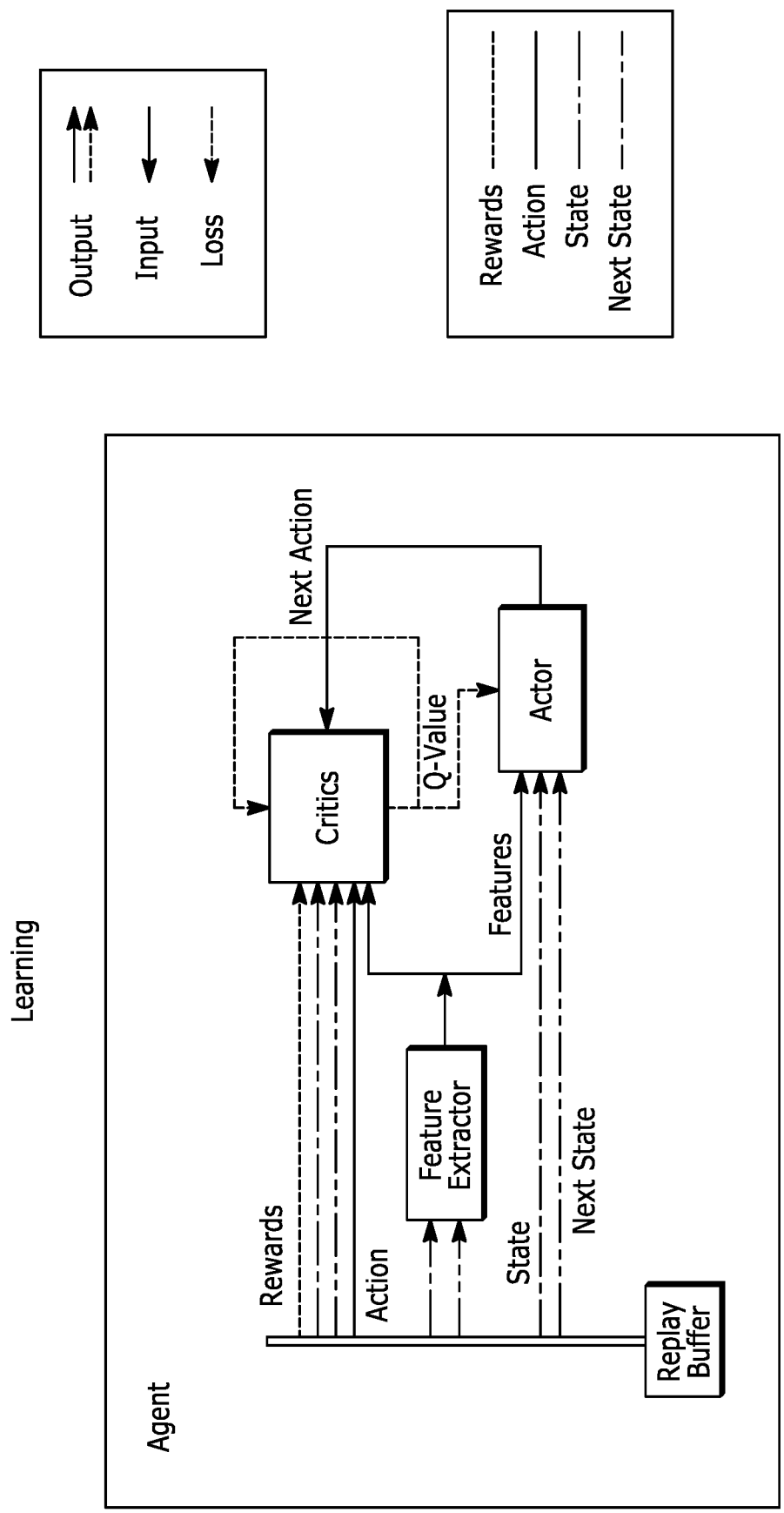
FIG. 8 illustrates the framework of an actor-critic model used during a learning or training phase, according to an embodiment.

FIG. 2 is an exemplary component diagram of a system 200 for optimizing a charging of a vehicle battery based on both simulation data and field data. As the system 200 relies on both simulation data and field data (e.g., actual production vehicles in use), the system 200 can be referred to as a hybrid system incorporating hybrid models. In non-hybrid embodiments, the system can rely on simulation data without the need for field data. In general, the system 200 may include a processor 202, a memory 204, a bus 206, and a simulator 208. The simulator 208 may be implemented via the processor 202 and the memory 204. In an embodiment, the simulator 208 may simulate or perform simulation associated with one or more agents 222, taking one or more actions 224, within a simulation environment 226, where one or more critics 228 interpret or evaluate one or more of the actions 224 taken by one or more of the agents 222 to determine one or more rewards 232 and one or more states 234 resulting from the actions taken. In an embodiment, the agent 222 takes, as input, environment output state 234 and reward 232, and then selects an action 224 to take; the action is a subdivision of the agent—they are similar in that both take a state as input and output an action, but they are different in that the actor does not see the reward (even as a loss) only seeing the critic outputs for a loss. FIGS. 7 and 8 show flow charts of this embodiment in which the actor-critic model is operating in an acting phase (FIG. 7) and in a learning phase (FIG. 8). Additional context of these figures is provided elsewhere herein.

The processor 202 is programmed to process signals and perform general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

The processor 202 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, graphics processing units (GPUs) tensor processing units (TPUs), vision processing units (VPUs), or any other devices that manipulate signals (analog or digital) based on computer-executable instructions residing in memory 204. In some examples, the processor 202 may be a system on a chip that integrates functionality of a central processing unit, the memory 204, a network interface, and input/output interfaces into a single integrated device.

Upon execution by processor 202, the computer-executable instructions residing in the memory 204 may cause an associated control system to implement one or more of the machine-learning algorithms and/or methodologies as disclosed herein. The memory 204 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium (e.g., memory 204) having computer readable program instructions thereon for causing the processor 202 to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

The processes, methods, or algorithms can be embodied in whole or in part using suitable hardware components, such as Application Specific Integrated Circuits (ASICs), Field-Programmable Gate Arrays (FPGAs), state machines, GPUs, controllers or other hardware components or devices, or a combination of hardware, software and firmware components.

The bus 206 can refer to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. In embodiments in which the battery is a vehicle battery, the bus may be a vehicle bus that interconnects components inside a vehicle using protocols such as Media Oriented Systems Transport (MOST), Controller Area network (CAN), Local Interconnect Network (LIN), among others.

The simulator 208 or the processor 202 may generate a policy network 240. In particular, the reinforcement learning disclosed herein, such as the actor-critic models, can include a deep deterministic policy gradient (DDPG), more specifically a twin delayed deep deterministic policy gradient (TD3), in order to construct a charging policy to optimize the battery charging. This can include a reward system design to minimize the charging time and degradation of the battery. The reward system is the combination of rewards given by the environment and any post-processing performed by the agent, such as the discount factor, that affect the quantitative assignment of the loss function. TD3 methods in particular allow for off-policy and offline learning, enabling the disclosed hybrid approach. The policy network 240 may be stored on the memory 204 of the system 100 for the reinforcement learning.

The system 200 may further include a communication interface 250 which enables the policy network 240 to be transmitted to other devices, such as a server 260, which may include a reinforcement learning database 262. In this way, the policy network 240 generated by the system 200 for reinforcement learning may be stored on a database of the server 260. The communication interface 250 may be a network interface device that is configured to provide communication with external systems and devices (e.g., server 260). For example, the communication interface 250 may include a wired and/or wireless Ethernet interface as defined by Institute of Electrical and Electronics Engineers (IEEE) 802.11 family of standards. The communication interface 250 may include a cellular communication interface for communicating with a cellular network (e.g., 3G, 4G, 5G). The communication interface 250 may be further configured to provide a communication interface to an external network (e.g., world-wide web or Internet) or cloud, including server 260.

The server 260 may then propagate the policy network 240 to one or more vehicles 270. While only one vehicle 270 is shown, it should be understood that more than one vehicle 270 may be provided in the system. Each of the vehicles can be either a simulation vehicle (e.g., used in lab simulations) or a field vehicle (e.g., vehicles used by consumers in actual driving and/or charging events). In hybrid embodiments, the system includes both simulation vehicle(s) and a field vehicle(s). In non-hybrid embodiments, the vehicle 270 may include a simulation vehicle without a field vehicle. The vehicle 270 may be any moving vehicle that is capable of carrying one or more human occupants, such as a car, truck, van, minivan, SUV, motorcycle, scooter, boat, personal watercraft, and aircraft. In some scenarios, the vehicle includes one or more engines. The vehicle 270 may be equipped with a vehicle communication interface 272 configured to communicate with the server 260 in similar fashion as the communication interface 250. The vehicle 270 may also include a battery 274 that is configured to at least partially propel the vehicle. Therefore, the term "vehicle" may refer to an electric vehicle (EV) that is powered entirely or partially by one or more electric motors powered by the electric battery 274. The EV may include battery electric vehicles (BEV) and plug-in hybrid electric vehicles (PHEV), wherein the battery 274 propels the vehicle 270. Additionally, the term "vehicle" may refer to an autonomous vehicle and/or self-driving vehicle powered by any form of energy. The autonomous vehicle may or may not carry one or more human occupants.

The vehicle 270 also includes a battery management system 276 configured to manage, operate, and control the battery 274. In particular, the policy network 240 output from the system 200 and sent to the vehicle 270 via the server 260 can command the battery management system 276 to control the battery 274 to charge or discharge in a particular manner. Therefore, the battery management system 276 may refer to associated processors and memory (such as those described above) configured to charge the battery 274 according to stored or modified instructions. The battery management system 276 may also include various battery state sensors configured to determine the characteristics of the battery 274, such as voltage, temperature, current, amplitude, resistance, and the like. These determined signals can, when processed, determine a state of health of the battery 274.

Figure 3:
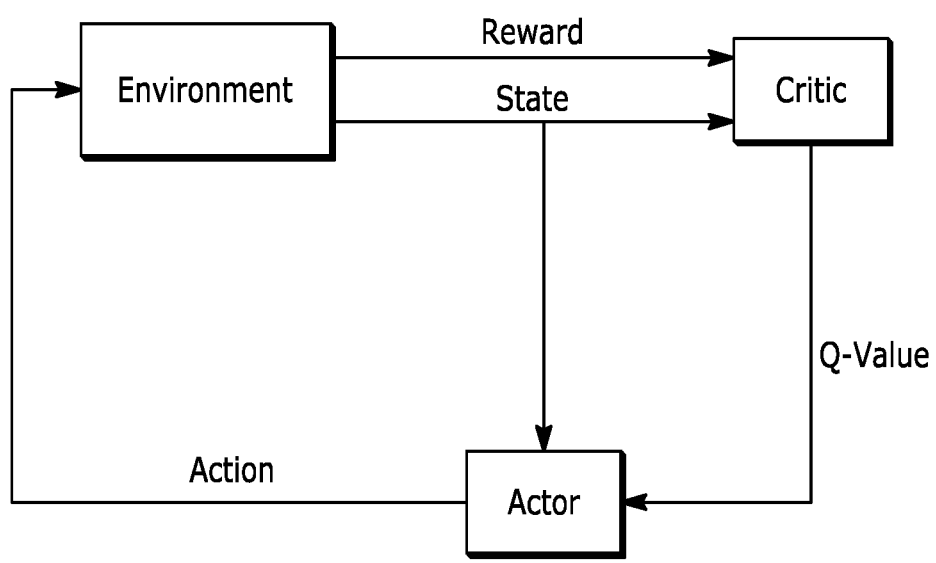
FIG. 3 illustrates the framework of an actor-critic model used for offline training, according to an embodiment.

FIG. 3 is a high-level block diagram of an actor-critic reinforcement learning model 300, according to an embodiment. In general, the actor-critic model 300 can be used for offline training of the reinforcement model. The environment can refer to the battery in simulation or a simulated vehicle. The term "agent" can include the actor and the critic together, along with the replay buffer and feature extractor. Here, the actor may take the action in the environment (e.g., the battery). The action can refer to the policy described above, e.g., a command sent to the battery management system regarding a commanded battery charge current. This may be interpreted, by the critic, as the reward or penalty and a representation of the state, which may be then fed back into the agent. The agent may interact with the environment by taking the action at a discrete time step. At each time step, the agent may receive an observation which may include the reward. The agent may select one action from a set of available actions, which results in a new state and a new reward for a subsequent time step. The goal of the agent is generally to collect the greatest amount of rewards possible.

Q-learning is a form of reinforcement learning which uses Q-values (also called action values) to iteratively improve the behavior of the learning agent. "Q" refers to the function that the algorithm computes—the expected rewards for an action taken in a given state. Q-values can be defined for states and actions on the environment, and represent an estimation of how good it is to take the action at the state.

The diagram of FIG. 3 shows the general flow of state observations and reward signals between the algorithm and the environment (e.g., the battery), the critic's update and its value estimate, which is used by the policy in its policy gradient updates. Discrete control action output is computed by the actor, given the state observation. The critic, computes a Q-value loss based on the state and the action.

An action-critic algorithm relies on using two neural networks to accomplish different tasks: the actor A, which takes as input the state, s, and outputs the action, a; A(s)=a, and the critic, C, which takes as input the state and action, and outputs the expected Q-value, C(s,a)=Q. The critic model learns from the data to estimate the Q-value (expected reward) from the state given a particular next action C(s,a)=Q, and rewards what is good, and passes this information on to the actor. The actor model learns a policy that maximizes the expected Q-value from the critic, resulting in the highest reward. The value and scale of Q are dictated by the somewhat arbitrary defined rewards system. For a fixed state, s, the highest value of C(s,a) generally corresponds to the best action to take from the state.

Figure 4:
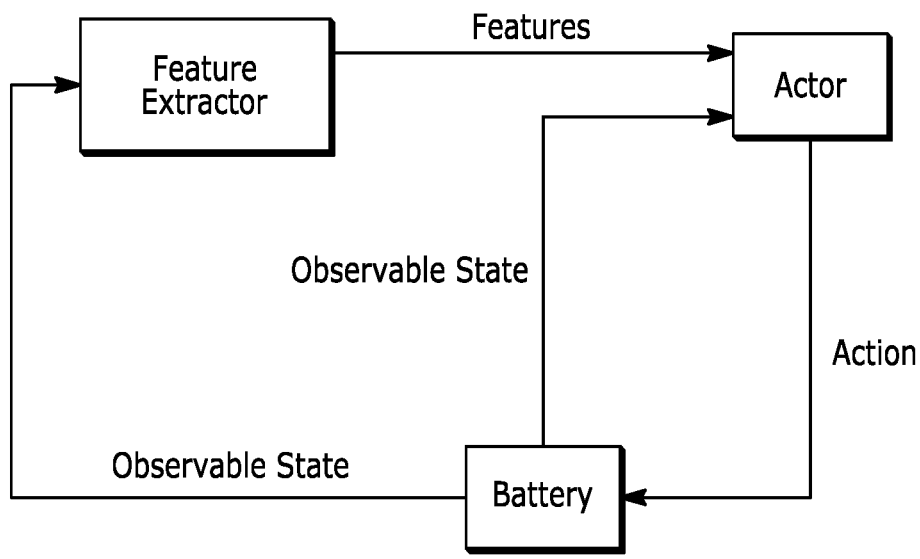
FIG. 4 illustrates the framework of an actor-critic model used during operation (e.g., non-simulation, on-field) according to an embodiment.

For hybrid applications—using simulation data as well as field data from real usage of vehicle batteries—the actor-critic setup can be a bit different. FIG. 4 illustrates a high-level block diagram of an actor-critic reinforcement learning model 400 that incorporates field data. During inference, e.g. operation of the vehicle, only the actor network (e.g., policy) is processing and learning. The critic's opinions are ignored at that point, and the actor policy is static. The battery management system (simulated or real) tells the actor information about the state (including the extracted long-short term memory (LSTM) features approximating the hidden states), and the actor provides the next action (charging current). In other words, the operational loop is only actor→battery. A loop of (action→battery→state→feature extractor→features→actor→action) with the skip connection of (battery→state→actor) is shown here. The critic, reward, and Q-value are not used during inference at all, only during training. In principle, the actor network is small enough that it could be operated within a vehicle during use, offline from the communication system shown in FIG. 2, for example.

Figure 5:
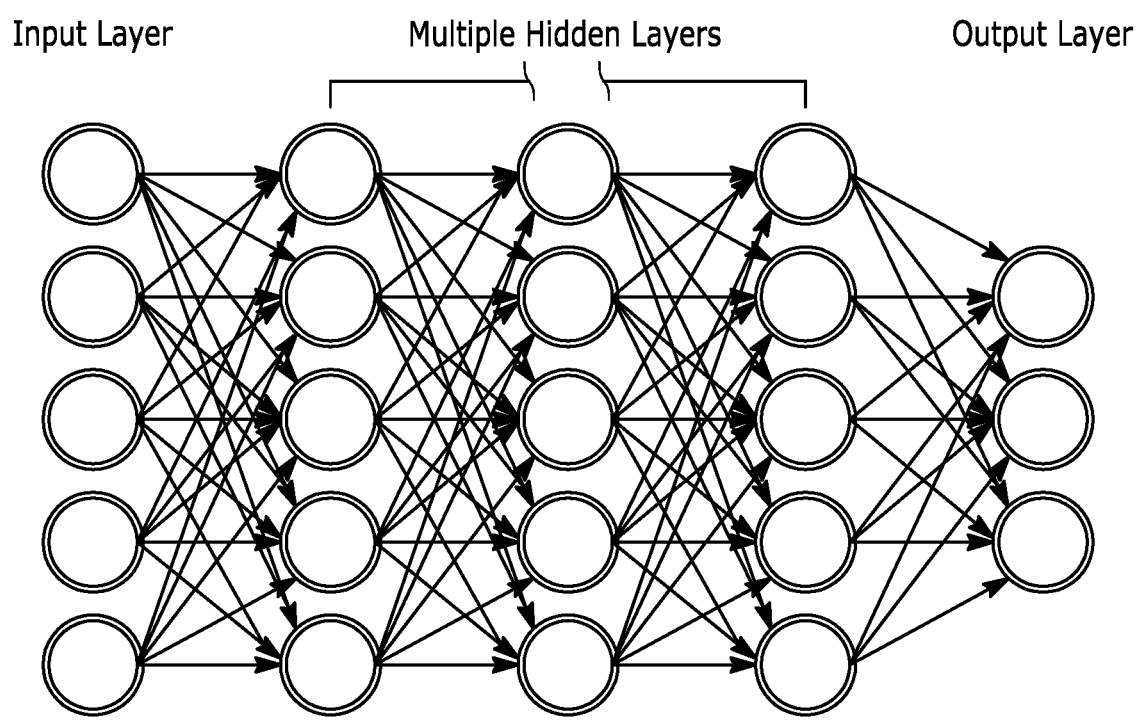
FIG. 5 shows a schematic of a deep neural network with nodes in an input layer, multiple hidden layers, and an output layer, according to an embodiment.

Each of the models disclosed herein can be implemented by a neural network or deep neural network (DNN), an example of which is schematically illustrated in FIG. 5. The neural network can be implemented by the one or more processors and memory disclosed herein. The illustrated network layout can be used for the actor model, the critic model, or other models configured to optimize a charging of the vehicle battery disclosed herein. The models can include an input layer (having a plurality of input nodes), a plurality of hidden layers, and an output layer (having a plurality of output nodes). The nodes of the input layer, output layer, the hidden layer(s) may be coupled to nodes of subsequent or previous layers. In a deep learning form, multiple hidden layers may be used in order to perform increasingly complex analyses; such deep learning is a subset of neural networks where the number of hidden layers is greater than one. With deep learning, these stacked hidden layers can help the system to learn by creating hierarchical representations of certain activities, where subsequently-created layers form an abstraction of previously-created layers as a way to formulate an understanding of complex correlations between the acquired data and a desired output such as a particular battery health condition (e.g., speed to full charge, other qualities described herein). And each of the nodes of the output layer may execute an activation function—e.g., a function that contributes to whether the respective nodes should be activated to provide an output of the model. The quantities of nodes shown in the input, hidden, and output layers are merely exemplary and any suitable quantities may be used.

Reinforcement learning in offline learning (e.g., DDPG, TD3) utilizes an actor-critic setup in which the reward system itself is based on the state of health variable for capacity (SOHC), state of health variable for resistance (SOHR), and the charging time (e.g., time to full charge). In a TD3 model in particular, a replay buffer that consists of states, actions, rewards, next states can be utilized, in which the model stores a replay buffer rather than learning from the current iteration. Then, according to embodiments disclosed herein, in a hybrid approach, the output SOHC and SOHR can be reweighted by the field measurements (e.g., battery measurements on a field vehicle) in order to hone the algorithm.

In particular, methods and systems are provided for optimizing a charging of a vehicle battery based on both simulation data and field data using actor-critic models. The system may include a simulation phase (e.g., simulator) with two phases. In the first phase, the simulation model is trained on instant feedback, such as anode overpotential as measured by the battery state sensors (e.g., voltage sensor). Anode overpotential is a parameter closely tied to aging, but unobservable in field data, thus is beneficial to be measured during simulation. This data can be measured instantly, and at every step during a single charge cycle. The data need not be gathered during a cycle-by-cycle evaluation, but instead can be measured at any point along any charge cycle or battery use cycle. The actor-critic model can be tasked to learn the factors and states that best impact the voltage efficiency of the battery. Random noise can be applied, and training can be quick. In principle, this can be altered by starting from the OEM policy.

Thereafter, in a second phase, this trained network transfers to a second actor-critic model which learns on a slower, more macro level such as a charge-by-charge basis. In other words, the second actor-critic model is configured to learn factors and states that best optimize the charging of the vehicle battery on a charge cycle-by-cycle basis. Each "cycle" of a charge can be the moment the battery begins to recharge until the battery is fully charge. In an embodiment, in this phase, the trained network is used to generate data with slowly varying Ornstein-Uhlenbeck noise. The reward system is transferred using an affine layer from an anode overpotential based reward system to one based on the SOHC and SOHR.

Then, the system can become a hybrid system by relying on field data. In particular, field data from actual consumer vehicles can be collected regarding the factors and states that best optimize the charging of the vehicle. Field data can provide a plethora of data not available in simulation, such as countless variations of elevation, temperature, air pressure, length of discharge, power output, and the like. The field data collected (e.g., from the respective battery state sensors) can be reprocessed through the actor-critic models disclosed herein. The state of health values output by the models from the simulation phases can be reweighted by the field measurements, allowing for the rewards to be constructed from these values.

Figure 6:
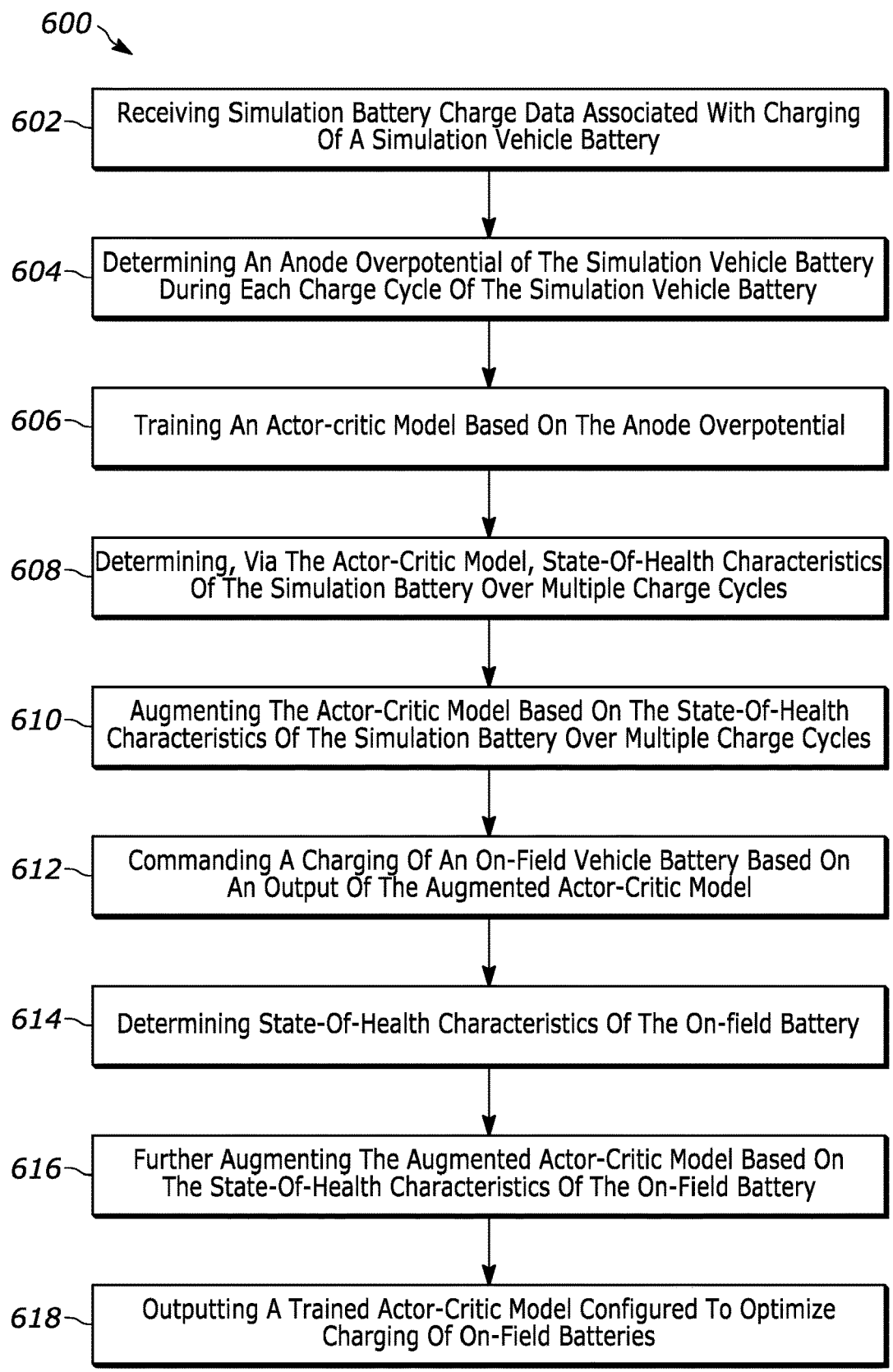
FIG. 6 shows a method of optimizing a charging of a vehicle battery based on both simulation data and field data, according to an embodiment.

FIG. 6 discloses a method 600 of optimizing a charging of a vehicle battery based on both simulation data and field data, according to an embodiment. The method can be implemented using the systems illustrated in FIGS. 1-5, for example. At 602, simulation battery charge data associated with charging of a simulation vehicle battery is received. This can be received at simulator 208, for example, based on battery state sensors of a simulation battery 274. Then, at 604, at the simulator, one or more sensors can determine an anode overpotential of the simulation vehicle battery. This can be determined based on voltage, and can represent voltage efficiency of the simulation vehicle battery 274.

At 606, an actor-critic model is trained based on the anode overpotential determined from 604. The actor-critic model can be trained with rewards given throughout the charge cycle of a simulation battery. In other words, the rewards can be continuously or at every step during a charge cycle, rather than relying on a cycle-by-cycle basis. This is described as a first phase of training above.

At 608, the actor-critic model can be used to determine state-of-health characteristics (e.g., SOHC, SOHR) of the simulation battery over multiple charge cycles. In other words, the rewards can be given during on a cycle-by-cycle, charge-by-charge basis, wherein each charge cycle gleans information that helps train the model. This is described as the second phase above.

At 610, the actor-critic model is augmented based on the state-of-health characteristics of the simulation battery over multiple charge cycles. Here, the actor-critic model is trained with rewards given on a cycle-by-cycle basis, per the second phase described above.

At 612, an on-field vehicle battery is introduced to create a hybrid approach. A charging of the on-field battery is commanded based on an output of the augmented actor-critic model. The commands can be given wirelessly via the cloud (e.g., server 260) to the battery management system 276, for example. Alternatively, the commands are made on-board the vehicle based on the augmented actor-critic model outputs given via the cloud.

At 614, state-of-health characteristics of the on-field battery are determined. This can be based on the charging characteristics regarding charging of the on-field vehicle battery. The state-of-health can be the SOHC and/or SOHR. At 616, the augmented actor-critic model is further augmented based on the state-of-health characteristics of the on-field vehicle battery determined in 614. Here, the actor-critic model is further trained with rewards given based on multiple charge cycles (e.g., on a charge-by-charge basis) since anode overpotential is not determined in the on-field vehicle battery. The previously determined SOHC and SOHR can be reweighted by the field measurements in order to hone the algorithm. This yields a trained actor-critic model configured to optimize charging of on-field vehicle batteries.

The models disclosed herein can be used for analyzing data extracted from the battery management system of an electric vehicle, including current, voltage, temperature, state of charge, and health related variables. This can be used to compute a control signal for charging of the battery, specifically an electric vehicle's lithium ion battery for example. It does so by learning a policy for controlling the physical system and then operating the physical system accordingly.

It should be understood that references made herein to charging of a battery are not limited to only vehicle applications. For example, the strategies disclosed herein for optimizing battery charging can apply to mobile phone batteries, power tool batteries, appliance batteries, lawn equipment batteries, and the like. The term "battery" should not be limited to a vehicle battery unless otherwise stated.

It should also be understood that the scope of the invention is not limited to only actor-critic models in particular, unless otherwise stated in the claims. Instead, the teachings provided herein can apply to various forms of reinforcement models, such as on-policy reinforcement models, off-policy reinforcement models, or offline reinforcement models. In off-policy reinforcement learning models, the agent learns from the current state-action-reward information produced by the current best policy when it interacts with the environment. In off-policy reinforcement learning models, the agent learns from past experience that is stored in a replay buffer that grows as it interacts more with the environment. The state-action-reward values in the buffer do not correspond to the current best policy. In offline reinforcement models, the agent learns from past experience that is stored in a replay buffer that is static; there is no continued interaction with the environment. Offline is a special case of off-policy; an on-policy algorithm cannot be used offline.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of optimizing a charging of a vehicle battery based on both simulation data and field data, the method comprising:
   receiving, at a simulator, simulation battery charge data associated with charging of a simulation vehicle battery;
   determining, at the simulator, an anode overpotential of the simulation vehicle battery during each charge cycle of the simulation vehicle battery;

training a reinforcement learning model based on the anode overpotential, wherein the reinforcement learning model is trained with rewards given throughout each charge cycle of the simulation vehicle battery;

determining, via the reinforcement learning model, state-of-health characteristics of the simulation vehicle battery over multiple charge cycles;

augmenting the reinforcement learning model based on the state-of-health characteristics of the simulation vehicle battery over multiple charge cycles, wherein the reinforcement learning model is trained with rewards given on a charge cycle-by-cycle basis;

commanding a charging of an on-field vehicle battery based on an output of the augmented reinforcement learning model;

based on the charging of the on-field vehicle battery, determining state-of-health characteristics of the on-field vehicle battery;

further augmenting the augmented reinforcement learning model based on the state-of-health characteristics of the on-field vehicle battery, wherein the reinforcement learning model is further trained with rewards given based on multiple charge cycles; and based on the further augmenting, outputting a trained reinforcement learning model configured to optimize charging of on-field vehicle batteries.

2. The method of claim 1, wherein the reinforcement learning model utilizes a twin delayed deep deterministic (TD3) policy gradient.

3. The method of claim 1, wherein the step of augmenting the reinforcement learning model based on the state-of-health characteristics of the simulation battery over multiple charge cycles further includes:

training the reinforcement learning model with rewards given only after each charge cycle has completed.

4. The method of claim 1, wherein the step of training the reinforcement learning model includes applying random noise.

5. The method of claim 1, wherein the step of commanding is sent via a remote server to a battery management system of an on-field vehicle.

6. The method of claim 1, wherein the step of augmenting the reinforcement learning model utilizes slowly varying Ornstein-Uhlenbeck noise.

7. The method of claim 1, further comprising:

transferring a reward system of the reinforcement learning model from (i) a first reward system in which the rewards are given throughout each charge cycle of the simulation vehicle battery to (ii) a second reward system in which the rewards are given on a charge cycle-by-cycle basis;

wherein the transferring uses an affine layer attached to a critic model.

8. A system of optimizing a charging of a battery based on both simulation data and field data, the system comprising:

one or more processors; and memory storing instructions that, when executed by the one or more processors, cause the one or more processors to:

receive, at a simulator, simulation battery charge data associated with charging of a simulation battery;

determine, at the simulator, an anode overpotential of the simulation battery during each charge cycle of the simulation battery;

train reinforcement learning model based on the anode overpotential, wherein the reinforcement learning model is trained with rewards given throughout each charge cycle of the simulation battery;

determine, via the reinforcement learning model, state-of-health characteristics of the simulation battery over multiple charge cycles;

augment the reinforcement learning model based on the state-of-health characteristics of the simulation battery over multiple charge cycles, wherein the reinforcement learning model is trained with rewards given on a charge cycle-by-cycle basis;

command a charging of an on-field battery based on an output of the augmented reinforcement learning model;

based on the charging of the on-field battery, determine state-of-health characteristics of the on-field battery;

further augment the augmented reinforcement learning model based on the state-of-health characteristics of the on-field battery, wherein the reinforcement learning model is further trained with rewards given based on multiple charge cycles; and based on the further augmenting, output a trained reinforcement learning model configured to optimize charging of on-field batteries.

9. The system of claim 8, wherein the reinforcement learning utilizes a twin delayed deep deterministic (TD3) policy gradient.

10. The system of claim 8, wherein the augmenting of the reinforcement learning model based on the state-of-health characteristics of the simulation battery over multiple charge cycles further includes:

training the reinforcement learning model with rewards given only after each charge cycle has completed.

11. The system of claim 8, wherein the reinforcement learning model is trained by applying random noise.

12. The system of claim 8, wherein at least one of the at least one processors resides on a remote server, and wherein the command of the charging of an on-field battery is sent via the remote server to a battery management system associated with the on-field battery.

13. The system of claim 8, wherein slowly varying Ornstein-Uhlenbeck noise is utilized in perturbing a policy of the reinforcement learning model.

14. The system of claim 8, wherein the memory stores further instructions that, when executed by the one or more processors, cause the one or more processors to:

transfer a reward system of the reinforcement learning model from (i) a first reward system in which the rewards are given throughout each charge cycle of the simulation battery to (ii) a second reward system in which the rewards are given on a charge cycle-by-cycle basis;

wherein the transfer uses an affine layer attached to a critic model.

15. The system of claim 8, wherein the simulation battery is a vehicle battery, and wherein the on-field battery is an on-field vehicle battery.

16. A non-transitory computer readable storage medium containing a plurality of program instructions, which when executed by a processor, cause the processor to perform the steps of:

receiving, at a simulator, simulation battery charge data associated with charging of a simulation vehicle battery;

determining, at the simulator, an anode overpotential of the simulation vehicle battery during each charge cycle of the simulation vehicle battery;

training reinforcement learning model based on the anode overpotential, wherein the reinforcement learning model is trained with rewards given throughout each charge cycle of the simulation vehicle battery;

determining, via the reinforcement learning model, state-of-health characteristics of the simulation vehicle battery over multiple charge cycles;

augmenting the reinforcement learning model based on the state-of-health characteristics of the simulation vehicle battery over multiple charge cycles, wherein the reinforcement learning model is trained with rewards given on a charge cycle-by-cycle basis;

commanding a charging of an on-field vehicle battery based on an output of the augmented reinforcement learning model;

based on the charging of the on-field vehicle battery, determining state-of-health characteristics of the on-field vehicle battery;

further augmenting the augmented reinforcement learning model based on the state-of-health characteristics of the on-field vehicle battery, wherein the reinforcement learning model is further trained with rewards given based on multiple charge cycles; and based on the further augmenting, outputting a trained reinforcement learning model configured to optimize charging of on-field vehicle batteries.

17. The non-transitory computer readable storage medium of claim 16, wherein the reinforcement learning utilizes a twin delayed deep deterministic (TD3) policy gradient.

18. The non-transitory computer readable storage medium of claim 16, wherein the step of augmenting the reinforcement learning model based on the state-of-health characteristics of the simulation battery over multiple charge cycles further includes:

training the reinforcement learning model with rewards given only after each charge cycle has completed.

19. The non-transitory computer readable storage medium of claim 16, wherein the step of commanding is sent via a remote server to a battery management system of an on-field vehicle.

20. The non-transitory computer readable storage medium of claim 16, wherein the program instructions, when executed by the processor, cause the processor to further perform the step of:

transferring a reward system of the reinforcement learning model from (i) a first reward system in which the rewards are given throughout each charge cycle of the simulation vehicle battery to (ii) a second reward system in which the rewards are given on a charge cycle-by-cycle basis;

wherein the transferring uses an affine layer attached to a critic model.

* * * * *